April 4, 1939.    H. ROSENTHAL    2,152,667
METHOD FOR EXTRACTING ANIMAL OILS
Filed Aug. 4, 1934    3 Sheets-Sheet 1

FIGURE 1

*Henry Rosenthal*
INVENTOR

April 4, 1939. H. ROSENTHAL 2,152,667
METHOD FOR EXTRACTING ANIMAL OILS
Filed Aug. 4, 1934 3 Sheets-Sheet 2

Henry Rosenthal
INVENTOR

April 4, 1939.  H. ROSENTHAL  2,152,667
METHOD FOR EXTRACTING ANIMAL OILS
Filed Aug. 4, 1934   3 Sheets-Sheet 3

Henry Rosenthal
INVENTOR

Patented Apr. 4, 1939

2,152,667

UNITED STATES PATENT OFFICE 2,152,667

METHOD FOR EXTRACTING ANIMAL OILS

Henry Rosenthal, New York, N. Y.

Application August 4, 1934, Serial No. 738,403

12 Claims. (Cl. 87—6)

My invention relates to a novel apparatus for and methods of extraction of animal products such as pork cracklings, utilizing low boiling hydrocarbons such as butane and propane and similar materials as the extracting medium, with the production of oily products such as lard and lard oil and the simultaneous production of a novel solvent free meal from which gelatinous substance of high nitrogen content may be obtained by extracting the meal with water as a solvent. I do not limit my invention for use with pork crackling as it may be equally well adapted to other similar products from other animals.

Lard is produced from pork in several ways, one of which is known as the process of dry rendering. In this process the pork scraps containing both meat and bone with portions of fat are delivered to a cylinder where they are subjected to a heating operation in which the fat is rendered liquid so that portions of it may be separated from the solid material by simple drainage. During this heating process, water contained in the charge is largely evaporated and the "crackling" resulting from the operation are a product containing approximately 10% or less of moisture, and up to 40% of fat. Cracklings, as discharged from the heating operation, are delivered to a cage hydraulic press which squeezes out further amounts of oil as a primary product and leaves the cracklings with usually over 10% and under 20% of oil when they are discharged from the press. The solid material discharged from the press is then usually ground and sold as chicken feed.

My method uses as its raw material either the crude crackling before pressing or the cracklings after pressing and I prefer to use the latter, as the extractor for the use of the cacklings in this condition and/or the method of handling the material during extraction is less complicated with the pressed materials than it is with the unpressed. However, I can modify the form of extractor and/or the extraction operations so that the unpressed cracklings may be used as the raw material.

In using the pressed crackling, I prepare them for the extraction by passing them through a roll train composed of a plurality of pairs of rolls, the first pair of rollers in the train having a serrated circumference on a cross section. The notches and teeth of one roll of a pair interlock with the notches and teeth of its mating roll which performs a crimping and crushing action on the material passing through the roll. The last pair of rolls is not equipped with teeth but has roughened surfaces, with the two rolls of a pair operating at different peripheral speeds. This latter pair clutches the crimped material and tears apart the cells while still leaving the material in the form of flakes.

When either of the pressed or unpressed cracklings are extracted with an oil solvent and the solution separated from the extract, an oily product which is partly liquid and partly solid, under ordinary temperature conditions, is obtained if no steps are taken to divide the extract into fractions having different melting points. I have found that by proper temperature control either of the solution within the extractor or of the solution withdrawn from the extractor, but before the solvent is removed from the extract, the extract may be secured in fractions as desired, one of which fractions is a liquid oil at ordinary temperatures, and another fraction being the solid oil at ordinary temperatures.

If the extraction is first conducted at a temperature range of between 15° F. and 25° F. the extract obtained from the solution will be a light colored oil which is liquid at ordinary temperatures. At lower temperatures, the oil will be a very light straw color and will be somewhat darker if the extraction is carried out at higher temperatures. However, the color obtained at any particular extraction temperature, will depend to some extent upon the nature of the material and the concentration of the solution. Where relatively large amounts of solvent are used the temperature must be maintained somewhat lower than when relatively small amounts of solvent are used in the extraction.

After the material has been substantially and completely extracted of the oil soluble at the above temperatures, it may be extracted at higher temperatures and additional oil will be dissolved. If the temperature range of the second extraction is from 35° to 45° F. the extract will be an oil, liquid at ordinary temperatures, and of a color which may vary, depending upon the conditions of extraction and the material extracted, between a light yellow and a light orange. By the use of a solid bleach, this oil may be converted into one of extremely light color, and the solid bleach may be used either after the solvent has been completely removed from the extract or after the solvent has been largely eliminated but prior to the final devolatilization of the extract. I prefer that when a light oil is desired for this second cut, the bleaching step be carried on simultaneously with the final devolatilization of the extract. The solid bleach used may be either fuller's-earth, activated carbon, or both. The materials, when used, are required in the usual amounts for such bleaching operations, that is, the fuller's-earth should be under 6% of the weight of the extract and the activated carbon should be under 1% of the weight of the extract.

If after the material is extracted in the manner above described, it is further extracted at higher temperatures, which should preferably be below 130° F., the extract will be an oil which is solid at ordinary temperatures. This oil may vary considerably in color, in some cases being a pure white solid when its temperature is reduced and in other cases being quite dark in color even though filtered prior to solidification. Where the oil is dark colored, it may be easily bleached in the manner described in the preceding paragraph.

Where the solution, from the extractor, is obtained in a single cut such as will be the case if the extraction is conducted entirely at temperatures in excess of 50° F., the extract obtained after filtering, while still warm, will be an oil varying in color from a pale yellow to orange. This oil, on slowly cooling at atmospheric temperatures or below, will precipitate a solid oil from the supernatent liquid oil by the usual method, or it may be preferably separated into cuts prior to the removal of the solvent from the extract, as will be described in the succeeding paragraph. If the extract is obtained in a single solution and it is quickly chilled to temperatures below 45° F. it will solidify into a solid fat having a color somewhat similar, but appreciably lighter, than the liquid oil of which it is composed.

Just as a number of separate cuts, each having different melting points, may be obtained by controlling the temperatures of the solution within the extractor, so separate cuts, each having different melting points, may be obtained by properly controlling the temperatures of the solution after it is withdrawn from the extractor and when the extraction has been conducted at temperatures which produce a solution containing the oil as a single cut. If such a solution, withdrawn from the extractor, is chilled to a temperature ranging between 15° F. and 25° F., the only portion of the oil which will remain in solution will be the cut which is a light straw colored liquid at ordinary temperatures, the balance of the oil being precipitated. The liquid solution may then be separated from the precipitate either by decanting or by filtration, and the extract recovered from the solution. The precipitate may then be separated into further fractions by maintaining it in contact with solvent at a temperature between 30° F. and 40° F. when a second cut, which is an oil, at ordinary temperatures, will remain in the liquid solution and the precipitate will be an oil which is solid at ordinary temperatures. These two cuts, that is, the oil associated with the solution and associated with the precipitate, may then be treated separately for removal of solvent from the oil. If instead of cooling the single solution from the extractor to a temperature of between 15° F. and 25° F. as the initial step in the separation into cuts of different melting points, the solution be cooled to a range between 30° F. and 40° F. and the separation be made at this temperature in the manner described above, then the extract obtained on removing the solvent will be obtained in two separate cuts, one of which is liquid at ordinary temperatures, and the other of which is solid, at ordinary temperatures. The temperatures given above are shown by way of example as they vary somewhat, depending upon the concentration of the solution used. Where the solution strength is weak, temperatures somewhat lower than those given above will be required while if the solution is quite concentrated, the temperatures required should preferably be somewhat higher than the figures cited above.

After the extraction is completed, the meal is entirely freed from solvent, which can easily be accomplished when low boiling hydrocarbons which are normally gases under ordinary conditions of temperature and pressure, are used as solvent. The meal thus obtained will contain less than 2% of oily or fatty material if the extraction has been properly conducted. The meal will be light colored, being somewhat creamy in color with a slight pinkish cast. It will have a high nitrogen content which will be in the neighborhood of 12½%. It will therefore make an excellent chicken food with no further treatment than proper grinding. However, due to its light color it might not be accepted by the trade in this form, as the materials now being marketed for this purpose are dark in color. However, I have found that I can easily modify the color of the meal by a simple further treatment and, at the same time, prepare it so that it is suitable for other purposes or, in the treatment, I can separate it into components, one of which is a substantially ash and fat free, nitrogenous substance having a nitrogen content in excess of 14%.

Thus if I treat the meal with water at a temperature below the atmospheric boiling point, a slurry is obtained which if dried and ground has an appearance very similar to that of the chicken feed, which is usually produced from the pressed cracklings, but my product will have a higher protein content than would be the case had the chicken feed been produced from the same pressed cracklings without previously extracting the fatty contents. Thus cracklings containing a nitrogen content of 11% and which would produce a chicken feed of this same nitrogen content by the usual method will make a chicken feed having a content in excess of 12% by my treatment, this increase in nitrogen content being due to the removal of the fat.

If the slurry is dried in molds, after drying, it will remain as a hard, cohesive solid of substantially the same shape as the mold in which the slurry is dried. If these molds are of proper shape, the resulting solid material will be an excellent food for dogs.

As an alternate modification, the slurry may be allowed to settle and the supernatent solution withdrawn and filtered. This solution is of a gelatinous character and the filtering step is best conducted at a controlled hydrogen ion concentration. The filtered solution thus obtained will be a substantially pure solution of nitrogenous organic compound and when properly dried will have a nitrogen content of approximately 15%, on an "as is" basis and of about 17% on a moisture free basis. The quality of this compound depends to an appreciable extent upon the heat treatment given the cracklings in the dry rendering process. If this has been carefully controlled, a type of gelatin will result from drying of the water solution.

The settlings from the slurry may be separately dried in the same manner as described in the preceding paragraphs and the dried material may either be ground and used as chicken feed or if dried in molds it may be used as dog food in the same manner as if the solution had not been separately withdrawn from the slurry.

The products so obtained from the settlings will be similar to the products obtained from the whole slurry but will have a lower nitrogen content and a higher ash content. The solution withdrawn from the settled slurry, after drying at a temperature of about 220° F. will be similar to dried glue or gelatin and will have a weight between 15% and 25% of the meal from which it is produced.

If water is not added but the extracted cracklings are heated to a temperature in excess of 240° F. they will be perceptibly darkened. This becomes more noticeable at about 250° F., and at 300° F. to 350° F. heating for 15 minutes will toast them.

While I prefer to use the cracklings after they have been pressed as the material to be extracted, by modification of my process, I can use the unpressed cracklings as a raw material. However, special precautions must be taken when the unpressed cracklings are used and the process modified accordingly. Due to the high oil content, the unpressed cracklings, if prepared by crimping and rolling as previously described, will form an oily mass through which it is extremely difficult to distribute the liquid solvent or from which it is difficult to remove the solution. Therefore, when the unpressed cracklings are used as a raw material, they should be first subjected to the preliminary extraction treatment in the form that they are discharged from the dry rendering process, prior to their comminution by crimping and rolling. Where a batch extractor is used, this will require that the cracklings as delivered from the dry rendering process be charged to the extractor and subjected to an extraction whereby the free fatty content is removed from the cracklings. The materials from this preliminary extraction must then be removed from the extractor and the solid discharged from the extractor be treated by crimping and rolling and recharged to the extractor in the same manner as are the pressed cracklings if substantially all of the fat is to be removed. In the preliminary treatment, the operation may be conducted in the same manner as previously described and the oil obtained in fractions of melting points as desired.

Where the extraction is carried out in a continuous extractor, it is not necessary to remove the cracklings from the extractor after the preliminary extraction, where unpressed cracklings are used. In this case, an extractor with a plurality of extraction compartments may be used and after a preliminary extraction in one compartment to which the cracklings are delivered as received from the dry rendering process, they are delivered through a set of rolls hereinbefore described, said rolls being positioned within the extractor, to another extraction compartment in which they are substantially completely extracted.

The fatty material obtained from the extraction of the pressed crackling contains a larger percentage of low melting point components than does the material obtained from the preliminary extraction of the unpressed cracklings. Thus at room temperature about 20% of the oil from the pressed cracklings will be solid, while under similar temperature conditions, about 40% of the oil from the preliminary extraction of the unpressed cracklings will be solid.

It is further pointed out that the rolling and crushing operation as described may be conducted on discharging the cracklings from the dry rendering processes and with such crushing and rolling, the cracklings will be in a good condition for the pressing operation, as is now generally conducted upon the cracklings in the condition as they leave the dry rendering process. The operation in the cage hydraulic press will secure more of the fat from the crushed material than it does under present operations. The discharge from the press, if rolled material is charged to the press, will be suitable for solvent extraction with little further mechanical treatment.

In carrying on my process I prefer to use the extractor specified and claimed in my copending applications filed coincidentally with this application and entitled "Oil treating process" S. N. 738,399, where the extraction is to be conducted in a continuous manner. Where the extraction is to be conducted in batches, I prefer to use the extractor specified and claimed in my copending application filed coincidentally with this application and entitled "Oil extraction" S. N. 738,400. Where the oil is recovered in fractional parts of different melting points, I prefer that the method used be that specified and claimed in my copending application filed coincidentally with this application and entitled "Separation of oils" S. N. 738,401. However, I do not limit this invention to the particular form disclosed in the above mentioned applications, nor do I limit it to any particular form of apparatus.

The principal object of my invention is to procure from animal scraps having a low use value other materials having a higher use value and to do this in an efficient and inexpensive manner. Other objects of my invention are apparent from this specification.

The operation of my invention may best be described with reference to the following drawings which from a part of this specification. In these drawings

Figure 1:
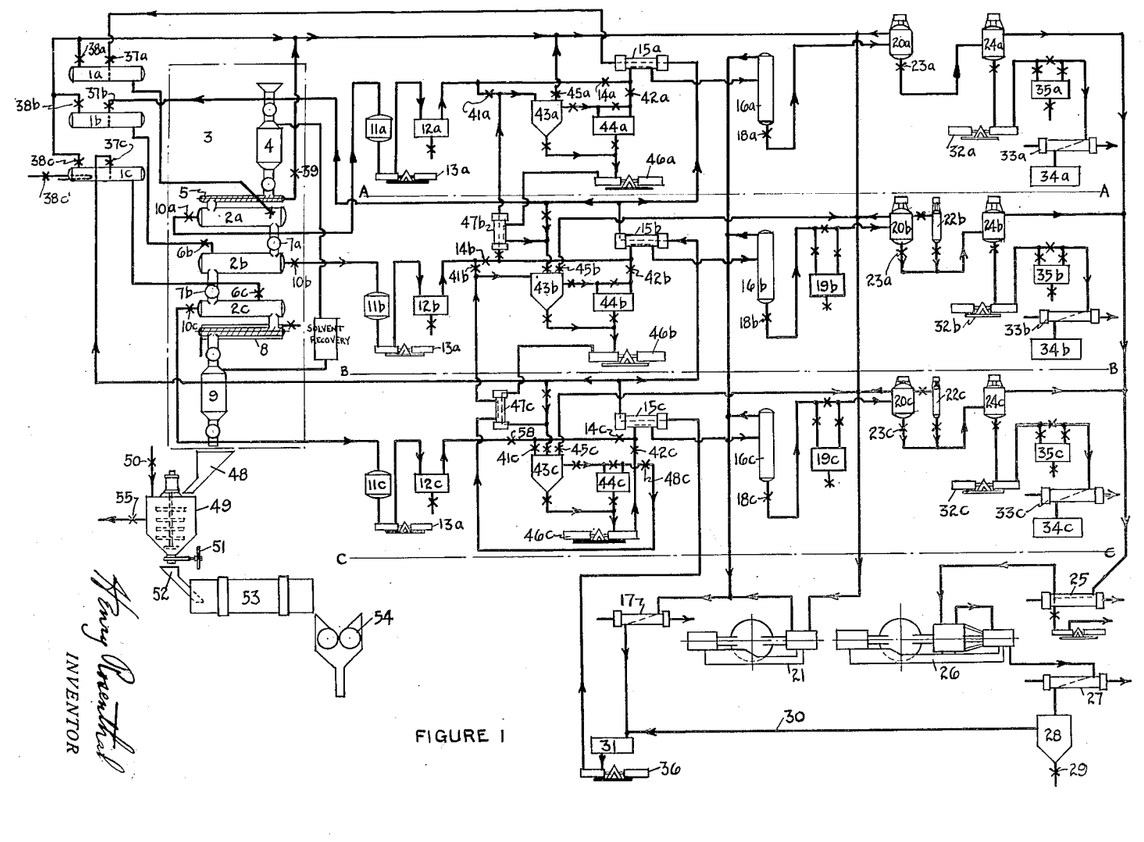
Figure 1 is an embodiment of my invention using continuous extraction and dividing the resultant oil into three fractions each having different melting points.

Referring to Figure 1. Tanks 1a, 1b and 1c are for the storage of solvent. The temperature of the solvent in each of these tanks is preferably different than the temperature of the solvent in each of the other two, the upper tank 1a being at the lowest temperature, 1b having an intermediate temperature and 1c the highest temperature. The temperature maintained in 1a should be such that when the solvent from this tank is applied to the material in the cylinder 2a of the extractor 3, high and intermediate melting point compounds of the oil contained in the cracklings, delivered to the cylinder 2a through the inlet compartment 4 and the conveyor 5 will remain almost entirely with the cracklings and will not pass into solution. This solvent from the tank 1a enters the cylinder 2a by means of the valve 6a. Solvent from the tank 1b enters the second cylinder of the tank 2b by means of the valve 6b. Similarly, solvent from the tank 1c enters the third cylinder 2c of the extractor through the valve 6c.

The cracklings enter the extractor through the sealed inlet compartment 4 and the screw conveyor 5 from which they are delivered to the upper cylinder of the extractor where they pass in a counter-current direction to the solution. In this cylinder, the cracklings are contacted with the solvent and after the oily fraction having the lowest melting point has been extracted, the solid material passes out of the cylinder 2a through the rotary valve 7a into the compartment 2b. Prior to delivering the solid material from cylinder 2b, it is not necessary to remove the solvent from the solid material as in the cylinder 2b, the solid meets an additional quantity of the same solvent but at a higher temperature. This temperature is maintained at such a value that substantially only the oil fraction having intermediate melting point will pass into solution, the oil fraction having low melting point already having been removed. Solid material remaining after extraction in cylinder 2b is delivered to cylinder 2c through the rotary valve 7b. As in the passage of the solid material from cylinder 2a to cylinder 2b efficient drainage of the solvent and the meal is not necessary; neither is it necessary in the passage from cylinder 2b to cylinder 2c. Extraction in cylinder 2c is conducted at temperatures sufficiently high that all of the oil remaining in the meal may be substantially completely removed. Before discharging meal from the cylinder 2c it should be efficiently drained before its delivery to the heated conveyor 8 in which the solvent remaining in the meal is substantially completely vaporized before the meal is delivered to the sealed outlet compartment 9.

Solution in the cylinder 2a is withdrawn through the valve 10a to the equalizing tank 11a. Solution from the cylinder 2b is withdrawn through valve 10b to the equalizing tank 11b. Similarly, solution from cylinder 2c is delivered to tank 11c.

In Figure 1 the portion above the broken line AA illustrates the method of treating the solution obtained in cylinder 2a. The portion above the line BB but below the line AA represents the method of treating the solution from cylinder 2b. The portion above the line CC but below the line BB represents the method of treating the solution obtained in cylinder 2c. Each of these portions is substantially alike, and therefore description will be confined to the portion lying above the line AA except for such details as wherein the three portions may vary from each other.

Solution from the tank 11a is delivered to the filter 12a by means of the pump 13a. Solution from the filter 12a may be handled in one of two different ways. If no further fractionation is desired than that obtained in the extractor, the solution is delivered through valve 14a to the heat exchanger 15a from which it passes to the still 16a, operated at the pressure of condenser 17. In still 16a, solvent is removed by the application of heat and the solvent vapors pass from the top of the still to the condenser.

The extract from which most of the solvent has been removed within the still 16a passes through valve 18a to the still 20a, where further solvent is removed by the application of heat at a lower pressure maintained by the exhauster 21. This exhauster compresses the solvent vapors removed and delivers them to the condenser 17. Oil containing traces of solvent is discharged from the still 20a through valve 23a to the still 24a where the final traces of solvent are removed. Vacuum may be maintained in still 24a and/or open steam may be used. Where open steam is used, the vapors from still 24a pass through condenser 25 where the major portion of the vapor is condensed before the vapors are delivered to the exhauster 26. Exhauster 26 compresses the vapors removed from still 24 to a pressure at which they may be condensed in condenser 27. The condensate from condenser 27 is delivered to the separator 28 where the water is removed through valve 29 and the solvent is delivered by pipe 30 to solvent tank 31 where it meets the condensate from the condenser 17. The oil from still 24a is removed by means of pump 32a and is delivered to the cooler 33a to the oil storage tank 34a. Where the oil from still 24a is not clear and brilliant it may pass through the filter 35a before being delivered to the oil cooler.

Solvent from tank 31 is returned to the solvent storage tanks 1a, 1b and 1c by means of the pump 36. The solvent first passes through heat exchanger 15c where it is partially cooled and a portion of the cooled solvent is delivered to tank 1c through the valve 37c. The remaining solvent passes through heat exchanger 15b where it is further cooled and a portion of the solvent cooled in this exchanger is delivered to the tank 1b through the valve 37b. A further portion is delivered to the heat exchanger 15a where it is still further cooled and passed to the solvent tank 1a through the valve 37a.

Temperature in solvent tank 1a may be controlled at any predetermined value below that of the atmosphere by opening valve 38a and allowing solvent vapors to pass into the suction of exhauster 21. Similarly, the temperature in tank 1b can be controlled, by allowing solvent vapors to pass through valve 38b. Likewise the temperature in tank 1c may be controlled by the operation of valve 38c, or by valve 38c' which admits heating medium to a coil within the tank where the temperature of the solvent in tank 1c is to be above that of the atmosphere.

In order to obtain the first cut reasonably free from higher melting point components, it is necessary to cool the cracklings fed into cylinder 2a prior to their delivery to the cylinder. This may be done in the conveyor 5 either by passing solvent vapors from the extractor through the conveyor and valve 39 to the suction of compressor 21 or it may be done by passing the cooling medium through jacket 40 of conveyor 5 (see Figure 7).

The low melting point oils will be generally of light color and do not require bleaching, as has previously been explained. However, for the higher melting point cuts it frequently becomes necessary to bleach the oil if it is to be light colored. I prefer that the bleaching take place within the still 24 and where this is done, it is preferable that the oil be filtered between the pressure still and the atmospheric still. Thus I show the filter 19b and 19c between the stills 16b and 20b and between the stills 16c and 19c respectively. Also solid bleach in suspension within the tank 22b is delivered along with the solution from still 20b to the still 24b. The solution obtained from the extractor cylinder 2c is treated in a similar manner.

Where the solution in the extractor has not been carried on in such a manner to divide the oil into sufficiently sharp fractions, further fractionation may be obtained by closing the valves 14a, 14b and 14c and further treating the solutions prior to the elimination of solvent from the solution. In this case, valves 41a and 42a are opened, which permits the solution from cylinder 2a to enter the separating means illustrated by the settling tank 43a and the filter 44a before being delivered to the heat exchanger 15a and the still 16a. The settling tank 43a may be maintained at any predetermined temperature, preferably below that maintained in cylinder 2a by opening valve 45a which permits solvent vapors to be withdrawn from the settling tank by exhauster 21. The temperature maintained in 43a is preferably such that all of the components belonging in either the second or third fraction will be precipitated along with small amounts of the components belonging in the first fraction. This precipitate separates from the remaining solution either by filtering or decanting and is delivered by suitable means such as the pump 46a through the heat exchanger 47b to the tank 43b and filter 44b. Where the separation is made as by decanting, enough liquid will generally accompany the solid material so that it can be pumped directly. Where the solid is separated by filtering, it will have to be melted by the application of heat before it can be pumped. The material left in solution will be delivered to the heat exchanger 15a and the still 16a and treated in a manner previously described. This method of treatment insures that the oil delivered to the oil storage tank 34a will contain no undesirable high melting point components.

In a similar manner, the solution from cylinder 2c can be delivered to the settling tank 43b and filter 44b by opening valve 41b. Here a temperature is maintained that will precipitate from the solution such components as are of higher melting point than is desired in the product to be delivered to tank 34b. These components are removed by pump 46b and delivered through heat exchanger 47c to tank 43c and filter 44c. A portion of the solution from 43b and 44b may be delivered back through heat exchanger 47b to tank 43a, if appreciable amounts of components which can be incorporated with the product for delivery to 34a are included in the solution delivered to tank 43b. The balance of solution from 43b and 44b are delivered to heat exchanger 15b and still 16b in a manner previously described.

The solution from the cylinder 2c may be delivered to the settling tank 43c and filter 44c by opening valve 41c. The fraction to be collected in tank 34c is usually desired as being normally solid under usual temperature conditions. Therefore, in tank 43c, it is usually the purpose to remove a normally liquid impurity from a normally solid fraction. The temperature should, therefore, be maintained at such a value that the normally liquid components contained in tank 43c will remain in liquid solution and that minor fractions of the lowest melting point components of the solid fraction also remain in the liquid solution. In this case, all of the liquid solution which is separated, is returned through valve 48c and heat exchanger 47c to the settling tank 43b. The solid material separated in 43c and 44c is delivered by any suitable means to the heat exchanger 15c and the still 16c where it is treated in a manner hereinbefore described.

It should be noted that the sharpness of the cuts will depend to some extent upon the amount of refluxing which takes place between the various separating means maintained under different temperature conditions. The greater the amount of refluxing relative to the amount of product withdrawn at any state, the sharper will be the cuts obtained. Thus by increasing the reflux ratio, products with relatively sharp differentiations of melting point can be secured.

It should further be noted that by closing the valve 42b and refluxing all of the solution from the intermediate separator to the first separator and refluxing all of the precipitate from the intermediate separator to the third separator, two end products may be obtained instead of three. However, one or the other of the end products must contain some intermediate components where only two fractions are secured. As an example, if the division is to be made into three fractions, one fraction may be a light colored oil which will remain liquid at 50° F.; another fraction would be a lard of good consistency, and the third fraction would be an intermediate oil. If, on the other hand, only two fractions are obtained and one of these is a lard of good consistency the other fraction will be an oil naturally of yellow color and having component of relatively high melting point.

Now returning to the solid extracted meal discharged from the outlet compartment 9. This material is discharged to the hopper 48 from which it is delivered to the digester 49, of suitable form. Hot water is delivered to the digester through the valve 50 and the mixture of meal and water is thoroughly digested in any suitable manner. The whole slurry obtained in the digester 49 may be delivered through the valve 51 and the chute 52 to the dryer 53 wherein the moisture is removed. The dried material is then delivered to the crusher 54 where it is reduced in size. The product leaving the crusher, if properly prepared within the crusher, will be chicken feed produced from the cracklings. However, it will have a high protein content, and oil content of less than 2% if the extraction has been properly conducted. No trace of solvent will remain with the chicken feed thus prepared.

As an alternate method, the slurry produced in the digester 49 may be allowed to settle and the supernatant liquid withdrawn through the valve 55. This liquid may be filtered and dried in any suitable manner (not shown in the diagram) with a production of a substantially oil free and ash free nitrogenous organic substance. Except for such water as may remain in this product, after drying, the product will be composed almost entirely of organic nitrogen compounds. A sample of material produced in the manner described and having a moisture content of about 12½% showed nitrogen content of about 14½% indicating a protein content in excess of 92% on a dry basis, even if the proteins are figured at the low ratio of 5.55 to 1 which is the ratio commonly used for figuring gelatin from nitrogen content. The slurry remaining after withdrawing the solution through the valve 55 may be again treated with water in a similar manner and an additional amount of solution may be removed in the same manner. This process may be repeated as desired. After the materials have been thus treated in the digester 49 the remaining slurry may be discharged through the valve 51 and treated in the same manner as when no solution was withdrawn from the digester 49. In this case the material discharged from the crusher 54 will be similar to the chicken feed usually prepared from the pressed cracklings. The protein content of the materials so prepared may be more or less than the protein content of a feed prepared directly from the cracklings without the treatment given them in my process. Where solution is withdrawn from the digester 49 in the manner above described the protein content of the material delivered from the crusher 54 will be dependent upon the amount and strength of solution separately withdrawn from the digester.

Whether solution is withdrawn from the digester or the slurry is removed from the digester without first having removed the solution, the material withdrawn through valve 51 may be molded in proper shape and the dryer used may be of a form which will retain the materials in the mold during drying process. In this case the materials leaving the dryer are not delivered to the crusher but may be disposed of in the molded form as a high protein content dog food.

Figure 2:
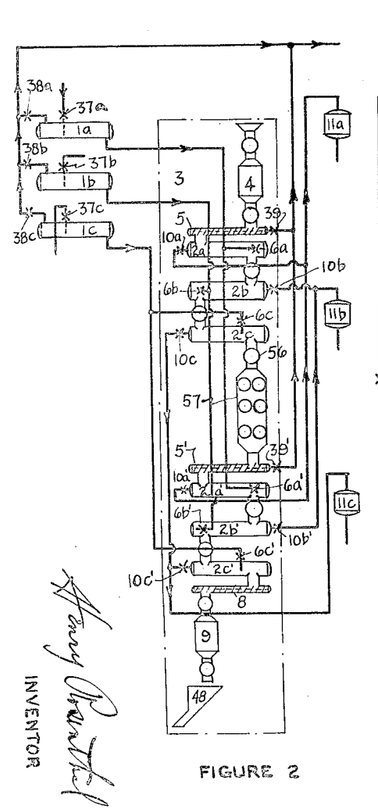
Figure 2 is a modification of Figure 1 in which the extractor is suitable for operation with unpressed material used in a continuous manner.

Now referring to Figure 2, which is a modification of Figure 1, whereby unpressed cracklings may be conveniently used in my process. In this figure unpressed cracklings as delivered from the dry rendering plant are delivered to the inlet compartment 4 of the extractor 3 from which they are passed through the cylinders 2a, 2b and 2c and treated in the same manner as hereinbefore described in connection with the unpressed cracklings. This treatment will effectively remove the superficial oil content of the cracklings which after the treatment will have a somewhat lower quantity of oil associated with them than do the cracklings after treatment in a cage press. They, therefore, may be crimped and rolled after this preliminary extraction without producing a mass that would be impervious within the extractor. After being removed from the cylinder 2c the cracklings are not drained as shown in Figure 1 but instead pass through the rotary valve 56 to the crimping and crushing rolls within the sealed compartment 57. There they are treated in the same manner as was described for the pressed cracklings and are delivered to the conveyor 5'. This conveyor delivers the comminuted material to the extractor cylinder 2a' where it is treated by solvent from cylinder 1a and is delivered to the cylinder 2b'. The solution from cylinder 2 and from cylinder 2a and 2a' may be mixed and delivered to tank 11a. The treatment of the cracklings after reaching cylinder 2a' may be exactly the same as the treatment hereinbefore described for unpressed cracklings.

Figure 3:
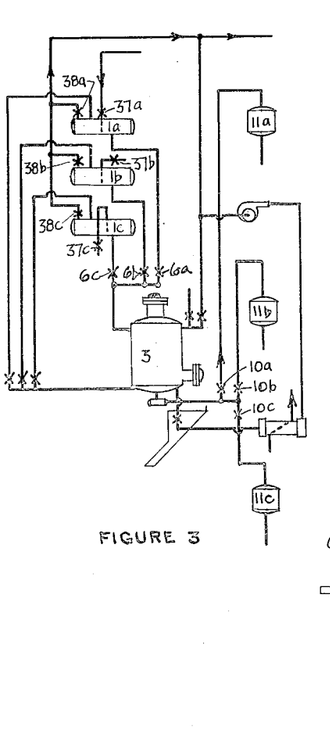
Figure 3 is a modification of Figure 1 using a batch extractor.

Figure 3 is a modification of my invention showing its adaptability to batch extraction method. In Figure 3, the single cylinder of batch extractor 3 may be used to perform the same functions as are performed in the cylinders 2a, 2b and 2c of Figure 1. However, with the batch extractor the functions which are performed consecutively on the same portion of cracklings but simultaneously on different portions of cracklings in the continuous extractor shown in Figure 1, are altogether performed in a consecutive manner on the same portion of cracklings. Thus after the extractor is charged with oleaginous material and properly prepared for the reception of the solvent, solvent from tank 1a is admitted through valve 6a and the solution is discharged through valve 10a to tank 11a from which it may be handled in the same manner as described and shown for Figure 1. After the solution has been discharged from the extractor, valve 6b may be opened and solvent from tank 1b delivered to the extractor. After treatment with this solvent, the solution is discharged from the extractor through valve 10b to tank 11b. Subsequently, solvent is admitted to the extractor through valve 6c and solution discharged through valve 10c to tank 11c. Provided tanks 11a, 11b and 11c are of sufficient size further treatment can be conducted in exactly the same manner as was described for Figure 1.

An alternate method of operation is to utilize tank 1a only instead of tank 1a, 1b and 1c. In this case a single solution is withdrawn from the extractor to the tank 11a and referring to Figure 1 valve 14b, 41b, 41c and 58 are closed. The entire solution entering the settling tank 43a may be maintained at temperatures such that only the lowest melting components remain as a liquid solution. Separation of a fraction can thus be made and by passing the various components between settling tank 43a, 43b and 43c with proper reflux, as previously described, separation of the product into two or three fractions may be respectively accomplished, even though only a single solution containing all of the fractions is withdrawn from the extractor. Similar results may be obtained with a continuous extractor suitable for withdrawing a single solution containing all the fractions in solution.

Figure 4:
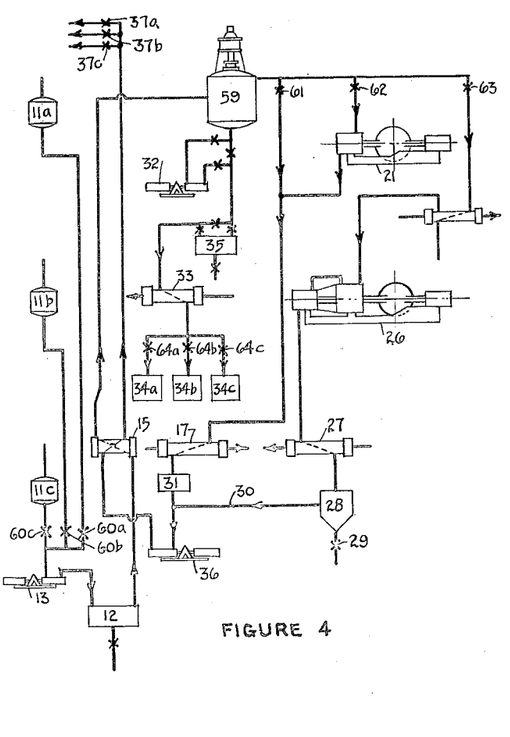
Figure 4 is a further modification for batch devolatilization of the solution from the extractor.

Figure 4 is a modification of Figure 1 especially suitable for use in conjunction with the batch extractor, shown in Figure 3. In Figure 4, solvent is removed from the extract in batches and still 59 consecutively performs the function of still 16, 20 and 24. Thus consider the solution in tank 11a. Solution is withdrawn through valve 60a, pump 13, filter 12 and heat exchanger 15 to the still 59. By opening valve 61, still 59 is placed in communication with condenser 17 and the functions performed in Figure 1 by still 16 are completed. Vapors withdrawn from the still 59 are condensed in the condenser 17 and the condensate delivered to the tank 31 from which it is withdrawn by the pump 36 and returned through the heat exchanger 15 and the valve 37a to the tank 1a. Valve 61 is then closed and valve 62 is opened which places the still 59 in communication with the exhauster 21. The functions performed by still 20 of Figure 1 are then conducted within the still 59. The vapors are withdrawn by the exhauster 21, are compressed and delivered to the condenser 17 from which they pass in a manner just described through valve 37a to the tank 1. After this operation is completed, valve 63 is opened which places the still 59 in communication with exhauster 26. Still 59 then performs the same function as does still 24 of Figure 1. The vapors withdrawn from still 59 by exhauster 26 are compressed and delivered to the condenser 27. Where open steam is used in this operation part of the water vapors withdrawn from the still 59 are condensed in the condenser 25 before the remaining vapors enter the exhauster 26. The condensate from condenser 27 is discharged to the separator 28 and the solvent from the upper part of the separator is returned through pipe 30, pump 36, heat exchanger 15 and valve 37a to the solvent tank 1a. At the completion of this operation the extract remaining in still 59 may be withdrawn by pump 32 to the oil cooler 33 either directly or through the filter 35. From the oil cooler, the extract passes through valve 64a to the oil storage tank 34a.

The solution from tank 11b may then be delivered to the still 59 through the valve 60b and may be treated in the manner described in the preceding paragraph. In this case, the solvent recovered would be delivered through valve 37b to the solvent tank 1b and the extract would be delivered through the valve 64b to the oil storage tank 34b. Furthermore, I prefer that prior to the operation in which the still 59 is in communication with the exhauster 26 through valve 63 a charge of solid bleaching agent be admitted to the still 59.

The solution from tank 11c may then be delivered to the still 59 through the valve 60c and treated in the manner described above. In this case the solvent is returned to the solvent tank 1c through the valve 37c and after the operation is completed the extract is delivered to valve 64c to the oil storage tank 34c.

Figures 5, 6, 7:
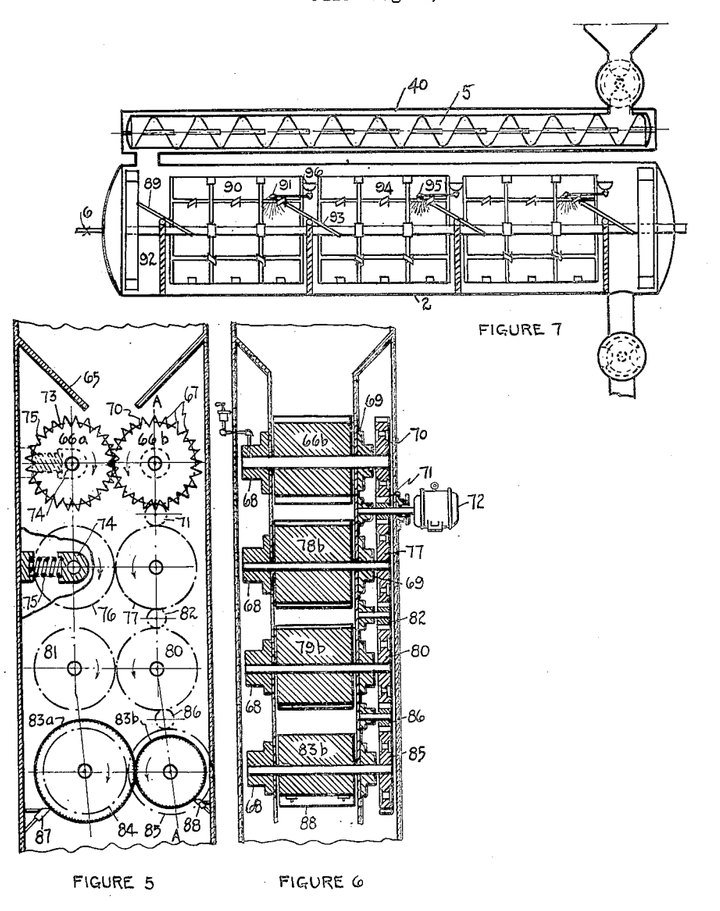
Figure 5 is an elevation of means for preparing the meats so that they may be readily extracted.
Figure 6 is a sectional elevation on the line AA of Fig. 5.
Figure 7 is an enlarged portion of the continuous extractor illustrated in Figures 1 and 2.

Now refer to Figures 5 and 6. These figures show preferred embodiment of means for comminuting the cracklings. As previously described, with pressed cracklings, the comminuting step should precede the charging of the cracklings to the extractor and in this case the roller device shown in Figures 5 and 6 would be placed to discharge into the inlet compartment 4. Where unpressed cracklings are used, the roller device shown in Figures 5 and 6 will be placed within the extractor at a point where the cracklings have been subjected to a preliminary extraction as hereinbefore described. The cracklings are delivered to the hopper 65 from which they are fed to a pair of rollers 66a and 66b. These rollers are serrated and provided with the interlocking teeth 67. These teeth should preferably be approximately ½ inch in height in order that they may easily handle the largest pieces of bone that may be associated with the cracklings. The roller 66b is mounted in the fixed bearings 68 and 69 which is driven by the gear 70 which in turn is driven by the pinion 71 connected with the motor 72. The gear 70 on the shaft of the roller 66b meshes with the gear 73 of similar size which drives the roller 66a. The roller 66a is mounted in a pair of bearings 74 (shown in Figure 5), which bearings are supported by the springs 75 which permit the movement of the roller 66a relative to the roller 66b. The roller 66a rotates clockwise and the roller 66b counter-clockwise as shown in Figure 5 and in delivering the cracklings from the hopper 65 to a similar pair of rollers immediately below, exerts upon the larger pieces of material in the cracklings, a cutting and crimping action. Rollers 66a and 66b are so set relatively to each other that only the largest are acted upon in passing through the rollers, the smaller pieces passing through freely.

Immediately below rollers 66a and 66b are a similar set of rollers driven by the gears 76 and 77. These rollers 78a and 78b are of similar construction to the rollers 66a and 66b except that the teeth should be only about ¼ of an inch in height and the rollers should be set closer to each other than are rollers 66a and 66b. Roller 78b is driven by the gear 77 which receives its power from the motor pinion 71. Gear 77 also drives the gear 76, of the same diameter, which operates the roller 78a.

Immediately below the pair of rollers 78a and 78b is a similar pair of rollers 79a and 79b in which the teeth are preferably about ⅛ inch in height and where the rollers are set closer to each other than are either the pair 66a and 66b or the pair 78a and 78b. These rollers are driven by the gears 80 and 81, the gear 80 being driven by the gear 77 through the pinion 82. Rollers 79a and 79b prepare the cracklings for delivery to the crushing rollers 83a and 83b which are mounted similarly to the pairs of rollers above described and are driven in a similar manner by the gears 84 and 85 which are preferably of similar diameter. The gear 85 is driven through pinion 86 by the gear 80, and gear 84 is driven by meshing with the gear 85. The rollers 83a and 83b thus operate at the same rotational speed but as roller 83a is of larger diameter than 83b their peripheral speeds are different so that they set up a tearing action as well as a crushing action upon the cracklings passing through them. Both rollers 83a and 83b should preferably have a roughened surface such as the longitudinal milling about 1/64th inch deep. Without this milling on at least one of these crushing rolls, the crimped cracklings will not be fed through the rollers if they are set together close enough to exert proper crushing action. The scrapers 87 and 88, with their edges set in close proximity to either roll, scrape from the rolls any material that may adhere thereto. Little of the material will tend to adhere to the smaller roll 83b, but a considerable amount will tend to adhere to the larger roll 83a. The scraper 88 may therefore be omitted, but the scraper 87 is essential for proper operation.

Figure 7 is an enlargement of the portion of the extractor shown in Figures 1 and 2. Solid material entering through the jacketed conveyor 5 is discharged upon the vane 89 which delivers it to the rotating cylinder 90 where it comes in contact with a solution delivered to the cylinder by the spray head 91. The solution passes through the freshly charged cracklings, and gains in concentration in this passage and is withdrawn through the bottom of the cylinder 90 and discharged into the compartment 92 from which it is withdrawn through the valve 6. The cracklings move forward in the rotating cylinder 90 and are discharged to the vane 93 which delivers them to the rotating cylinder 94. Here they meet a less concentrated solution admitted through the spray head 95 and are further extracted. The solution is withdrawn from the bottom of the cylinder 94 and is delivered to the trough 96 and the spray head 91. In this way the solution and the cracklings pass through the extractor countercurrently to each other. As many rotating cylinders may be used in series as is necessary to substantially effect complete extraction. A single cylindrical shell such as the shell 2 with its heads and interior compartments may be used as an extractor and a single solution obtained, or a plurality of shells may be placed in series with each other and a plurality of solutions obtained as illustrated in Figures 1 and 2.

Many changes may be made in the details of my invention without departing from the spirit of my invention, and I do not limit myself to the particular form shown.

Having described my invention so that it may be readily understood by one skilled in the art, I claim:

1. The method of extracting oleaginous, partially dehydrated animal scraps which comprises subjecting said scraps to a hydrocarbon solvent, gaseous at ordinary temperature and pressure, maintaining the solvent in the liquid phase while in contact with the material to be extracted, withdrawing the solution, passing the solution through a filter press vaporizing a portion of the solvent to separate it from the extract, and then simultaneously vaporizing the remaining solvent and bleaching the extracted oil by the application of heat in the presence of a solid bleach.

2. The method of extracting oleaginous, partially dehydrated animal scraps which comprises comminuting said scraps by crimping and rolling, then subjecting the comminuted scraps to a hydrocarbon solvent gaseous at ordinary temperature and pressure, maintaining the solvent in the liquid phase while in contact with the material to be extracted, withdrawing the solution, and vaporizing the solvent to separate it from the extract.

3. The method of extracting oleaginous, partially dehydrated animal scraps which comprises comminuting said scraps by crimping and rolling, then subjecting the comminuted scraps to a hydrocarbon solvent gaseous at ordinary temperature and pressure, maintaining the solvent in the liquid phase while in contact with the material to be extracted, withdrawing the solution, vaporizing the solvent at a temperature below 130° F. to separate it from the extracted scraps.

4. The method of extracting oleaginous, partially dehydrated animal scraps which comprises subjecting said scraps to a hydrocarbon solvent gaseous at ordinary temperature and pressure, maintaining the solvent in the liquid phase while in contact with the material to be extracted, at a temperature below 25° F. and above 15° F. whereby there is produced a liquid solution containing only oily components which remain liquid at ordinary temperatures, and a solid solution containing the oily components which remain solid at ordinary temperature, withdrawing said liquid solution and vaporizing the solvent to separate it from the liquid solution.

5. The method of extracting unpressed pork cracklings which comprises subjecting said cracklings to a preliminary extraction using as a solvent a hydrocarbon gaseous at ordinary temperature and pressure, maintaining the solvent in the liquid phase while in contact with the material to be extracted, withdrawing the solution, and thereafter comminuting the partially extracted cracklings and subjecting them to a further extraction in a like manner, and finally vaporizing the solvent to separate it from the extract.

6. In the process of extracting pork cracklings with a hydrocarbon solvent, the steps which comprise vaporizing solvent from the solution of lard and solvent, until the solvent remaining is only a small percentage of the lard, filtering then adding a solid bleach to the lard and remaining solvent, and finally substantially completely removing the solvent from the lard by the application of heat in the presence of the solid bleach.

7. In the process of extraction from partially dehydrated animal scrap, the step of crimping and crushing the scrap, in order to prepare the scrap for said extraction.

8. The method of extracting unpressed pork cracklings which comprises subjecting said cracklings to a preliminary extraction using as a solvent a hydrocarbon gaseous at ordinary temperature and pressure; maintaining the solvent in the liquid phase while in contact with the material to be extracted; withdrawing the solution, and thereafter crimping and rolling the partially extracted cracklings and subjecting them to a further extraction in a like manner, and finally vaporizing the solvent to separate it from the extract.

9. The method of extracting partially dehydrated animal scraps which comprises: subjecting said scraps to a preliminary extraction using a solvent in the liquid phase while in contact with the material to be extracted, withdrawing the solution, and thereafter comminuting the partially extracted scraps and subjecting the comminuted scraps to a further extraction, withdrawing the solution from said further extraction, and vaporizing the solvent to separate it from the solution.

10. In the process of extracting oleaginous, partially dehydrated animal scraps, the steps which comprise: subjecting the scraps to a plurality of extraction stages in which said scraps are maintained in contact with a hydrocarbon solvent, gaseous at ordinary temperature and pressure and maintained in the liquid phase while in contact with the material to be extracted, the extraction stages being conducted at successively increasing temperatures, such temperature in the initial extraction stage being maintained that normally solid components of the fat form a solid solution, and normally liquid components of the fat form a liquid solution with the solvent, such temperature in the final extraction stage being maintained that the normally solid components of the fat form a liquid solution, whereby the fat is removed from the scraps in fractions, one of which is substantially solid and one of which is substantially liquid at ordinary temperatures.

11. In the process of extracting pork cracklings with a hydrocarbon solvent, gaseous at ordinary temperature and pressure, the steps which comprise: separately subjecting said cracklings to said solvent maintained in the liquid phase in a plurality of extraction stages conducted at successively increasing temperatures, the first extraction stage being maintained at a temperature such that normally solid lard forms a solid solution and normally liquid lard forms a liquid solution with the solvent; separately withdrawing a plurality of liquid solutions each containing oily components of different melting points; separately vaporizing the solvent from each solution; whereby there is obtained a lard that is normally substantially solid, and a lard that is normally substantially liquid, as separate products.

12. In the process of extracting pork cracklings with a hydrocarbon solvent, gaseous at ordinary temperature and pressure, and maintained in the liquid phase while in contact with the cracklings, the steps which comprise: first treating the cracklings with the solvent while maintaining temperatures below 25 deg. F. to produce a solid solution containing normally solid lard and a liquid solution containing normally liquid lard; then withdrawing the liquid solution; and then treating the residual cracklings with a hydrocarbon solvent, gaseous at ordinary temperature and pressure, maintained in liquid phase while in contact with the residual cracklings maintained at a higher temperature, to remove the normally solid lard therefrom.

HENRY ROSENTHAL.